(12) United States Patent
Smith (10) Patent No.: US 11,912,345 B2
(45) Date of Patent: *Feb. 27, 2024

(54) CENTER LOAD STEERING RACK SUPPORT

(71) Applicant: Shock Therapy Suspension, Inc., Duluth, GA (US)

(72) Inventor: Justin Smith, Wittman, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/188,884

(22) Filed: Mar. 23, 2023

(65) Prior Publication Data

US 2023/0227096 A1 Jul. 20, 2023

Related U.S. Application Data

(63) Continuation of application No. 17/828,165, filed on May 31, 2022, now Pat. No. 11,639,190, which is a continuation of application No. 17/113,233, filed on Dec. 7, 2020, now Pat. No. 11,345,392, which is a continuation of application No. 16/786,036, filed on Feb. 10, 2020, now Pat. No. 10,858,035, which is a continuation of application No. 16/550,016, filed on Aug. 23, 2019, now Pat. No. 10,556,615.

(60) Provisional application No. 62/722,666, filed on Aug. 24, 2018.

(51) Int. Cl.
*B62D 3/12* (2006.01)
*B62D 1/20* (2006.01)

(52) U.S. Cl.
CPC .................. *B62D 3/12* (2013.01); *B62D 1/20* (2013.01)

(58) Field of Classification Search
CPC .................................... B62D 3/12; B62D 1/20
See application file for complete search history.

(56) References Cited

U.S. PATENT DOCUMENTS

| | | | |
|---|---|---|---|
| 3,298,708 A | 1/1967 | Jean | |
| 6,457,375 B1 | 10/2002 | Buch | |
| 8,708,358 B2 | 4/2014 | Harris et al. | |
| 9,586,614 B2 | 3/2017 | Izutani et al. | |
| 11,345,392 B1 * | 5/2022 | Smith | B62D 3/12 |

* cited by examiner

*Primary Examiner* — Faye M Fleming
(74) *Attorney, Agent, or Firm* — Schmeiser, Olsen & Watts LLP (57) ABSTRACT

A center load rack and pinion steering mechanism is disclosed. The mechanism comprises a center load steering rack housing mounted to a vehicle frame, with a longitudinal slot through the front surface thereof, the slot being fitted with a bushing of a material that is resistant to damage from heat and bending. A pair of center link mounting bolts secure a center link and a center link pad to the rack wherein the center link pad extends through the bushing such that the upper and lower surfaces of the center link pad engage the upper and lower inner surfaces of the bushing, respectively, to prevent upward and downward movement and twisting of the center link and the center link pad relative to the rack in response to steered wheels of the vehicle contacting rough or uneven terrain while in use to prevent damage to components of the steering mechanism.

6 Claims, 10 Drawing Sheets

CENTER LOAD STEERING RACK SUPPORT

CROSS REFERENCE TO RELATED APPLICATION

This application is a continuation of U.S. patent application Ser. No. 17/828,165, filed May 31, 2022, which is a U.S. patent application Ser. No. 17/113,233, filed Dec. 7, 2020, now U.S. Pat. No. 11,345,392, issued May 31, 2022, which is a continuation of U.S. patent application Ser. No. 16/786, 036, filed on Feb. 10, 2020, now U.S. Pat. No. 10,858,035, issued Dec. 8, 2020, which is a continuation of U.S. patent application Ser. No. 16/550,016, filed on Aug. 23, 2019, now U.S. Pat. No. 10,556,615, issued on Feb. 11, 2020, which claims priority to U.S. Provisional patent application Ser. No. 62/722,666, filed Aug. 24, 2018, the disclosures of which are hereby incorporated entirely herein by reference.

BACKGROUND OF THE INVENTION

Technical Field

This invention relates generally to rack and pinion steering mechanisms and particularly to a support apparatus for a center load steering rack.

State of the Art

UTV's, ATV's, and other vehicles having center load rack and pinion steering mechanisms are often driven off road, either professionally or recreationally. It is common for the steered wheels to engage rough and uneven terrain. It is also common for the steered wheels to become airborne, such as in response to contacting a bump on the ground at high speed, and then to land harshly. Under such conditions, the steering mechanism may be subjected to extreme forces and shock loads that are transmitted to the steering mechanism through the tie rods and vehicle frame in response to the steered wheels contacting the rough and uneven terrain.

A common problem with existing center load rack and pinion steering mechanisms is that these extreme forces and shock loads are transmitted through the tie rod mounting bolts, or, where applicable, to the center link mounting bolts, to the rack. These forces and loads result in variable twisting and jarring of the rack, and, in some cases, harsh contact of the mounting bolts with the housing, causing damage to any of the rack, the pinion, the housing, or the mounting bolts. Such damage may result in loose engagement of components and reduced efficiency and overall functionality of the rack and pinion steering mechanism. Such damage may also result in a feeling of "softness" or "play" in the steering linkage to the driver and prevented positive steering reaction.

Accordingly, what is needed is a support apparatus for the rack and the center link mounting bolts, or the tie rod mounting bolts, that is able to withstand these extreme forces and shock loads and better maintain the position of the mounting bolts relative to the rack and to the housing to minimize damage to components of the steering mechanism.

SUMMARY OF THE INVENTION

The present invention relates generally to rack and pinion steering mechanisms and particularly to a support apparatus for a center load steering rack.

Embodiments of a center load rack and pinion steering mechanism, of the present invention, comprise an elongate housing coupled to the frame of a vehicle. The housing contains a pinion gear that engages a geared section of an elongate rack such that the rack travels longitudinally within a longitudinal passage in the housing in response to rotation of the pinion gear. The pinion gear is coupled to a steering column that extends through an aperture in the housing to a steering wheel in the passenger compartment of the vehicle. Rotation of the steering wheel by a driver of the vehicle results in rotational forces being transmitted to the pinion gear through the steering column to rotate the pinion gear. Travel of the rack within the passage is limited by closed left and right ends of the housing.

The housing further comprises a longitudinal slot through the front surface thereof. A center link is coupled to the rack by a pair of center link mounting bolts that extend through a pair of spaced apertures in the center link, through the slot, to the rack. A pair of tie rods are operationally coupled to the center link by a pair of heim joints. The center link moves longitudinally along the front surface of the housing in response to the longitudinal motion of the rack within the passage of the housing. In turn, the tie rods move to steer the steered wheels of the vehicle in response to motion of the center link.

The slot is lined with a bushing that is made of a material that is resistant to damage from heat and resistant to bending, such as brass, for example. The bushing has opposed upper and lower inner surfaces and opposed left and right ends. A center link pad extends through the slot and surrounds the center link mounting bolts. The center link pad has a pair of spaced apertures through which the center link mounting bolts extend within the slot. The mounting bolt center link pad has an upper surface that engages the upper surface of the bushing and a lower surface that engages the lower surface of the bushing. The upper surface of the center link pad is biased against the upper surface of the bushing and the lower surface of the center link pad is biased against the lower surface of the bushing to prevent upward and downward motion of the center link relative to the housing in response to varied upward and downward forces and shock loads in the center link resulting from contact of the steered wheels with the ground while the vehicle is in motion. The flush contact of the center link pad with the bushing also prevents twisting and varied upward and downward movements of the rack relative to the housing, thus minimizing damage to components of the steering mechanism.

Alternative embodiments do not comprise a center link, nor a pair of center link mounting bolts. In such embodiments, each of a pair of tie rod mounting bolts engages the rack directly, the tie rod mounting bolts extending through the center link pad to the rack. Each of the pair of tie rod mounting bolts is also coupled to one of a pair tie rods by a heim joint. The interfaces between the center link pad and the bushing similarly act to prevent twisting and varied upward and downward movements of the tie rod mounting bolts and the rack relative to the housing, thus minimizing damage to components of the steering mechanism.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate generally to rack and pinion steering mechanisms and particularly to a support apparatus for a center load steering rack.

A rack and pinion is commonly found in the steering mechanism of wheeled, steered vehicles. A rack and pinion is a type of linear actuator that comprises a circular gear, known as the pinion, that engages a linear gear bar, known as the rack. Rotational forces applied to the pinion, in response to a driver turning the steering wheel of the vehicle, cause the rack to move relative to the pinion, thereby translating the rotational motion of the pinion into linear motion of the rack. Tie rods are operably coupled with the rack and transfer the movement of the rack to the steered wheels for steering of the vehicle. Most racks, commonly known as end load racks, are configured such that the tie rods couple to the ends of the rack, most commonly with a pair of heim joints. Some racks, commonly known as center load racks, are configured such that the tie rods couple to the rack at a location near the midpoint of the rack, also commonly with a pair of heim joints.

Some vehicles, including many Utility Task Vehicles ("UTV's") and All-Terrain Vehicles ("ATV's"), have steered wheels that are relatively close together, leaving little room for a rack and pinion steering mechanism with an end load rack, together with the tie rods, to fit into the limited space between the steered wheels. Many such vehicles have rack and pinion steering mechanisms with center load racks because such steering mechanisms with center load racks require less space between the steered wheels to function due to the central mounting location of the tie rods on the rack.

Conventional center load racks have a pair of tie rod mounting bolts for mounting the inner ends of the tie rods to the steering mechanism. The tie rod mounting bolts may be screwed directly into the rack, proximate the midpoint of the rack, or they may be screwed into a center link, which in turn is bolted into the rack, proximate the midpoint of the rack, typically by use of a pair of center link mounting bolts. In any case, the tie rod mounting bolts, in the first instance, or the center link mounting bolts, in the second instance, engage the rack through an elongate aperture through the exterior wall of a housing mounted to the frame of the vehicle, such that the housing encloses the rack and pinion and the heim joints of the tie rod ends remain external to the housing.

UTV's, ATV's, and other vehicles having center load rack and pinion steering mechanisms are often driven off road, either professionally or recreationally. It is common for the steered wheels to engage rough and uneven terrain. It is also common for the steered wheels to become airborne, such as in response to contacting a bump on the ground at high speed, and then to land harshly. Under such conditions, the steering mechanism may be subjected to extreme forces and shock loads that are transmitted to the steering mechanism through the tie rods and vehicle frame in response to the steered wheels contacting the rough and uneven terrain.

A common problem with existing center load rack and pinion steering mechanisms is that these extreme forces and shock loads are transmitted through the tie rod mounting bolts, or, where applicable, to the center link mounting bolts, to the rack. These forces and loads result in variable twisting and jarring of the rack, and, in some cases, harsh contact of the mounting bolts with the housing, causing damage to the any of the rack, the pinion, the housing, or the mounting bolts. Such damage results in loose engagement of components and reduced efficiency and overall functionality of the rack and pinion steering mechanism. Such damage also results in a feeling of "softness" or "play" in the steering linkage to the driver and prevented positive steering reaction.

Referring to the drawings, as shown in FIGS. 1-10, embodiments of a center load rack and pinion steering mechanism 10, of the present invention, comprise an elongate housing 12 having opposed first and second closed ends 14 and 16, opposed top and bottom surfaces 18 and 20, and opposed front and rear surfaces 22 and 24. The housing 12 is coupled to the frame of a vehicle (not shown) at a location proximately midway between two steered wheels (not shown) of the vehicle. In some embodiments, the housing 12 comprises a plurality of protrusions 26 with apertures 28 therethrough for receiving mounting bolts (not shown) for mounting the housing to the frame of the vehicle. Although, in some embodiments, the housing 12 is coupled to the frame of the vehicle with mounting bolts, this is not intended to be limiting. The housing 12 may be coupled to the frame of the vehicle by any means known by a person of skill in the art.

Figure 4:
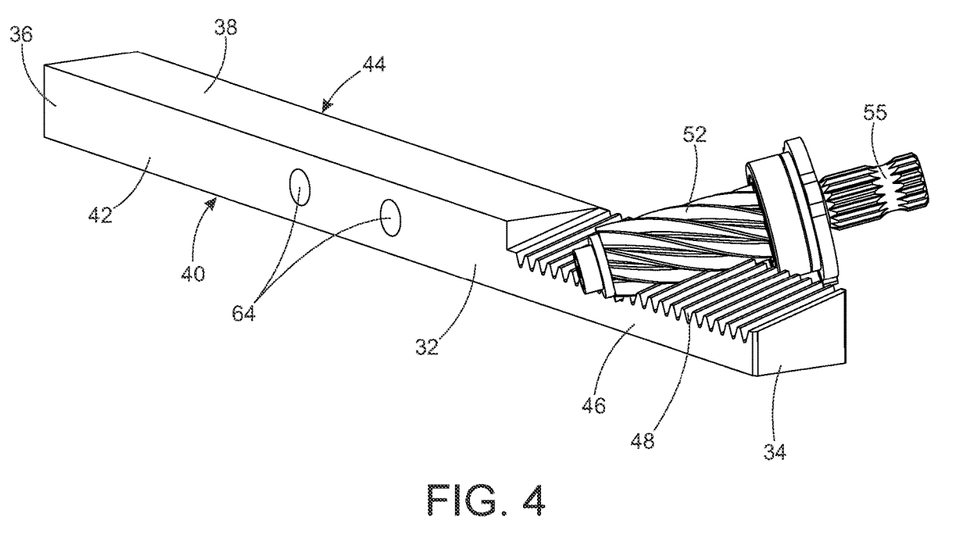
FIG. 4 is a perspective view of a rack with a pinion gear of a center load rack and pinion steering mechanism, according to an embodiment.

The housing 12 has an inner passage 30 that contains a rack 32. As shown in FIG. 4, the rack 32 is an elongate member having opposed first and second ends 34 and 36, opposed top and bottom surfaces 38 and 40, and opposed front and rear surfaces 42 and 44. The rack 32 may comprise a geared section 46 proximate the first end 34 of the rack, wherein the geared section 46 has a plurality of gear teeth 48 that are disposed substantially latitudinally across and protrude upward from the top surface 38 of the rack 32. In some embodiments, the housing 12 comprises a protrusion 50 proximate the first end 14 of the housing 12 for containing a pinion gear 52 that engages the geared section 46 of the rack 32. The pinion gear 52 is coupled to a lower end of a steering column 55. The steering column 55 is coupled to the pinion gear 52 through an aperture 54 in the protrusion 50 of the housing 12. The steering column 55 extends from the pinion gear 52 in a rearward and slightly upward direction through the aperture 54 in the protrusion 50 of the housing 12 to a steering wheel in a passenger compartment of the vehicle (not shown).

In some embodiments, the geared section 46 of the rack 32 is located proximate the midpoint of the rack 32. In some embodiments, the geared section 46 of the rack 32 is located proximate the second end of the rack 32. In some embodiments, the geared section 46 of the rack 32 is located on the bottom surface 40 of the rack 32, with the gear teeth 48 extending downward therefrom. In any case, the housing 12 is configured to contain the pinion gear 52, such that the pinion gear 52 engages the geared section 46 of the rack 32.

When a driver of the vehicle rotates the steering wheel (not shown), rotational forces are transmitted through the steering column 55 to the pinion gear 52 to rotate the pinion gear 52. The rack 32 slides longitudinally through the passage 30 of the housing 12 in response to rotation of the pinion gear 52. In some embodiments, travel of the rack 32 within the passage 30 is limited by the first and second closed ends 14 and 16 of the housing 12.

Figure 1:
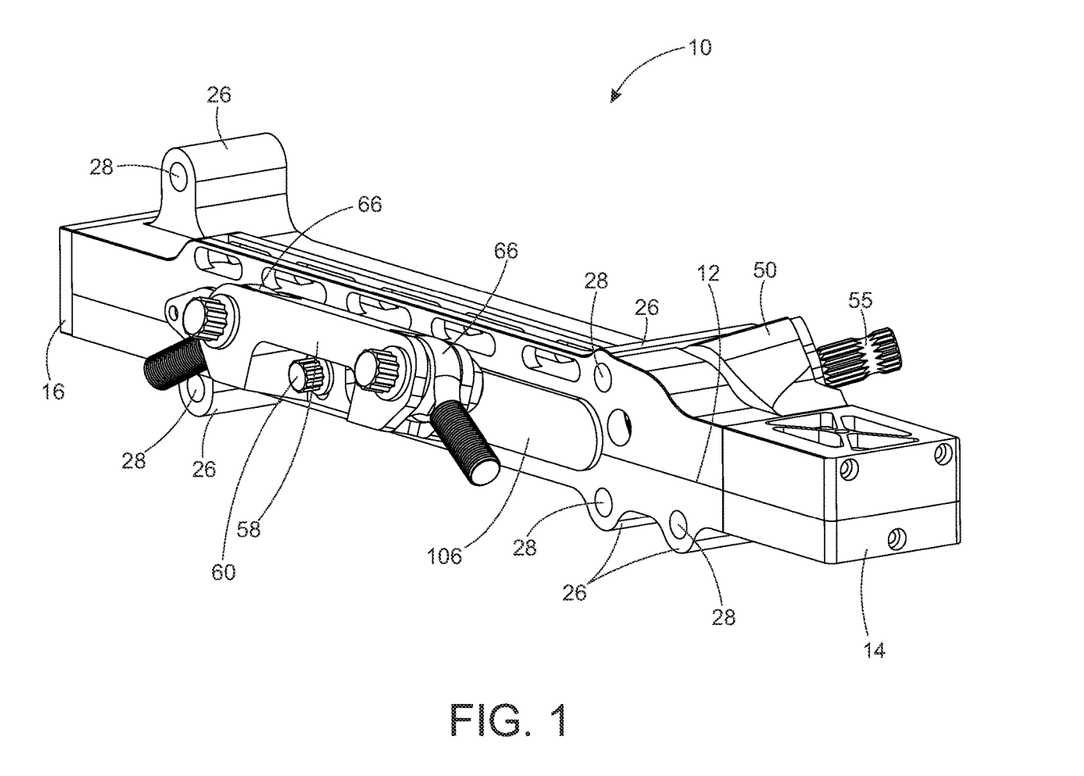
FIG. 1 is a perspective view of a center load rack and pinion steering mechanism, according to an embodiment.
Figure 2:
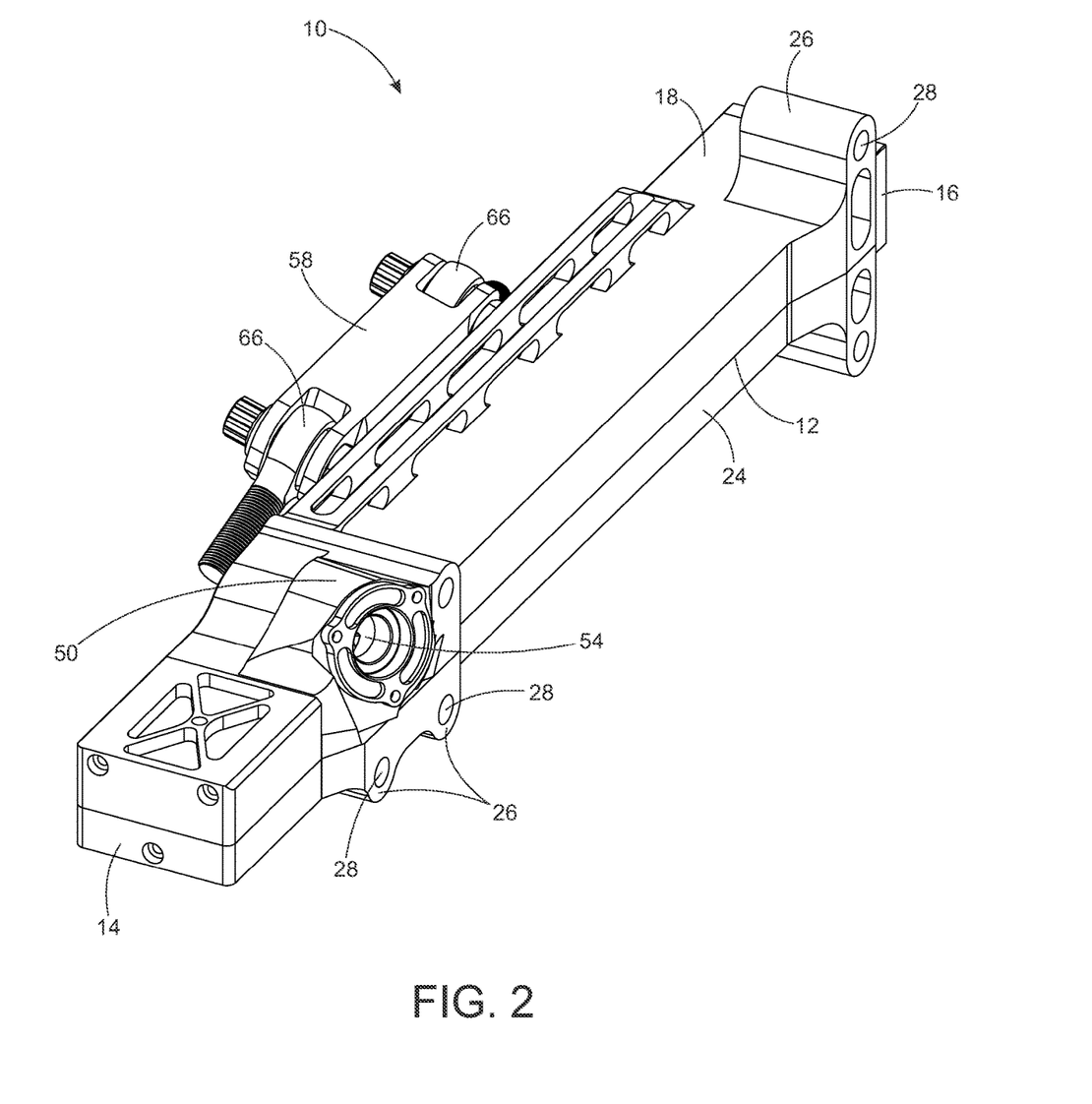
FIG. 2 is an alternative perspective view of a center load rack and pinion steering mechanism, according to an embodiment.
Figure 3:
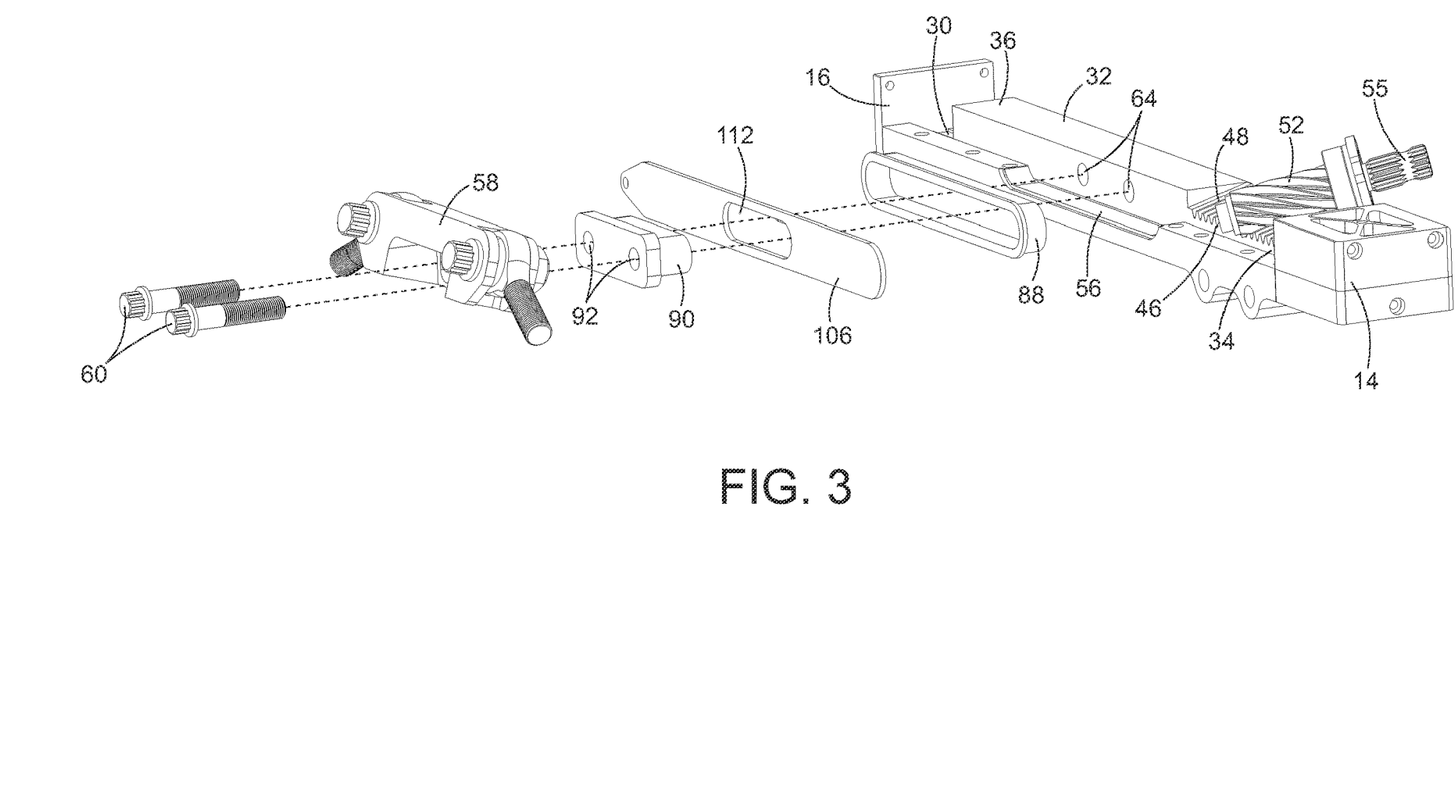
FIG. 3 is an exploded view of a center load rack and pinion steering mechanism, according to an embodiment.
Figure 5:
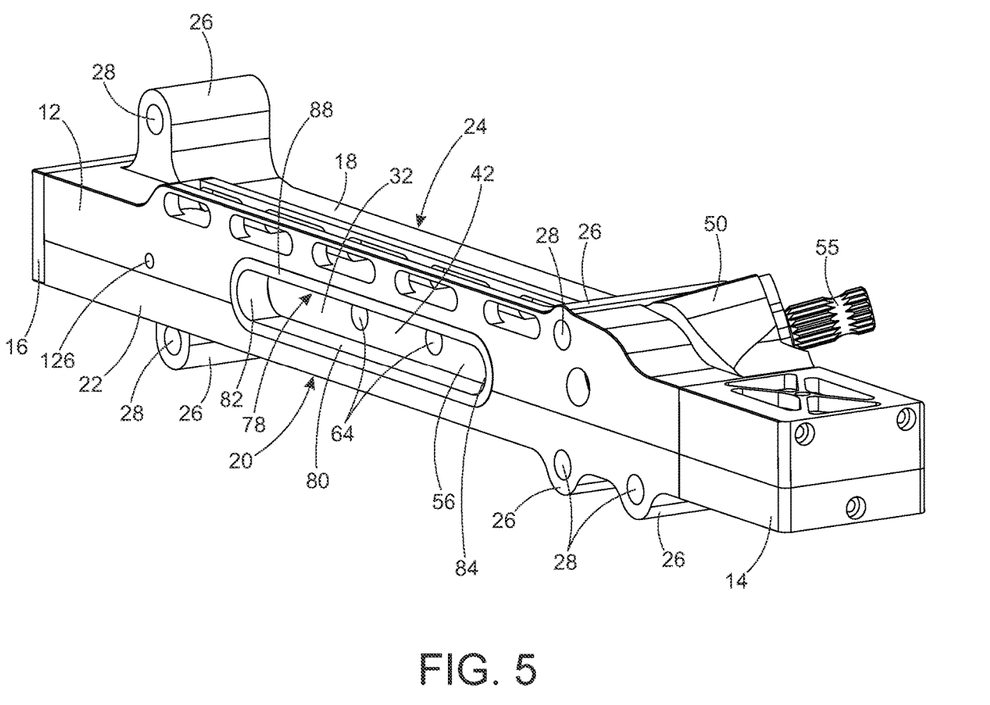
FIG. 5 is a perspective view of a housing of a center load rack and pinion steering mechanism, according to an embodiment.
Figure 8:
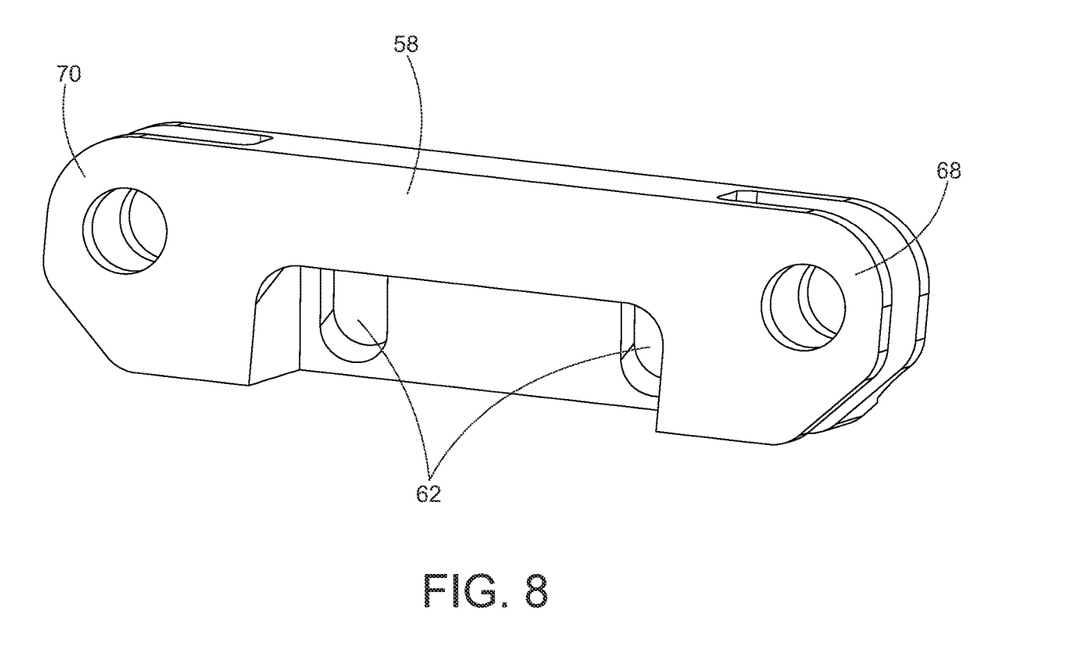
FIG. 8 is a perspective view of a center link of a center load rack and pinion steering mechanism, according to an embodiment.
Figure 9:
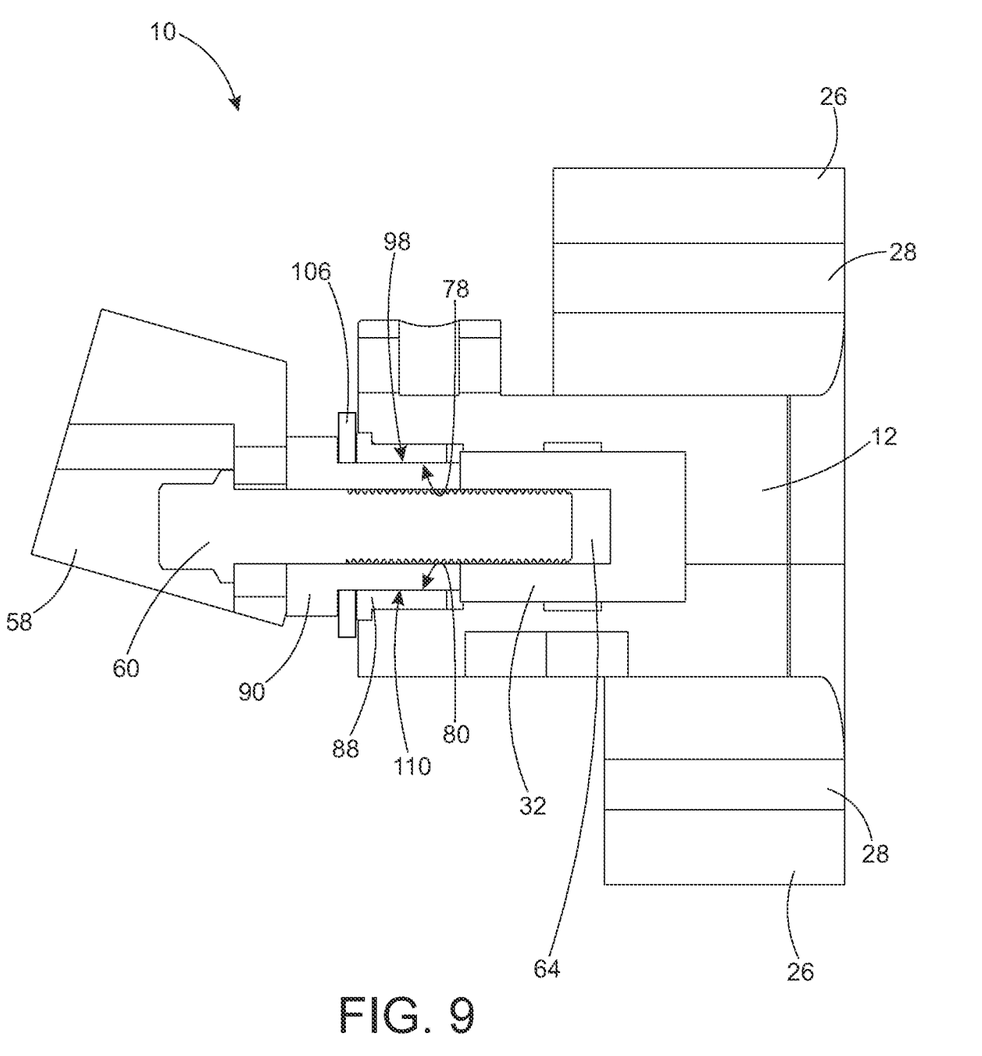
FIG. 9 is a section view of a center load rack and pinion steering mechanism, according to an embodiment.

As shown in FIG. 5, the housing 12 further comprises a longitudinal slot 56 through the front surface 22 of the housing 12. As shown in FIGS. 2-3, a center link 58 is coupled to the rack 32 by a pair of center link mounting bolts 60 that extend through a pair of spaced apertures 62 in the center link 58, through the slot 56, and engage a pair of spaced threaded recesses 64 in the rack 32 for receiving the center link mounting bolts 60. FIG. 8 is a perspective view of a center link of the present invention. A pair of tie rods (not shown) are operationally coupled to the center link 58 by a pair of heim joints 66, as shown in FIGS. 1-3, one heim joint 66 being located at a first end 68 of the center link 58 and the second heim joint 66 being located at an opposing second end 70 of the center link 58. The center link 58 moves longitudinally along the front surface 22 of the housing 12 in response to the longitudinal motion of the rack 32 within the passage 30 of the housing 12. In turn, the tie rods (not shown) move to steer the steered wheels (not shown) in response to motion of the center link 58.

Although embodiments of a housing comprise a longitudinal slot through the front surface thereof, this is not intended to be limiting. The slot may be through any surface of the housing that is consistent with the functions of a center load rack and pinion steering mechanism. For example, the slot may be through one of a top surface, a bottom surface, a rear surface, or any other surface of the housing.

Particular features of embodiments of the present invention relate to the manner in which the center link 58 is coupled to the rack 32 through the slot 56 through the front surface 22 of the housing 12. The slot 56 is lined with a bushing 88 that is made of a material that is resistant to damage from heat and resistant to bending, such as brass, for example. The bushing 88 has upper and lower surfaces 78 and 80, and may have opposed arcuate left and right ends 82 and 84. A center link pad 90 extends through the slot 56 and surrounds the center link mounting bolts 60. The center link pad 90 has a pair of spaced apertures 92 through which the center link mounting bolts 60 extend within the slot 56. As more clearly shown in FIG. 9, the mounting bolt center link pad 90 has an upper surface 98 that engages the upper surface 78 of the bushing 88 and a lower surface 100 that engages the lower surface 80 of the bushing 88. The upper surface 98 of the center link pad 90 is biased against the upper surface 78 of the bushing 88 and the lower surface 100 of the center link pad 90 is biased against the lower surface 80 of the bushing 88 to prevent upward and downward motion of the center link 58 relative to the housing 12 in response to varied upward and downward forces and shock loads in the center link 58 resulting from contact of the steered wheels (not shown) with the ground while the vehicle is in motion. The flush contact of the center link pad 90 with the bushing 88 also prevents twisting and varied upward and downward movements of the rack 32 relative to the housing 12, thus minimizing damage to components of the steering mechanism 10.

Figure 7:
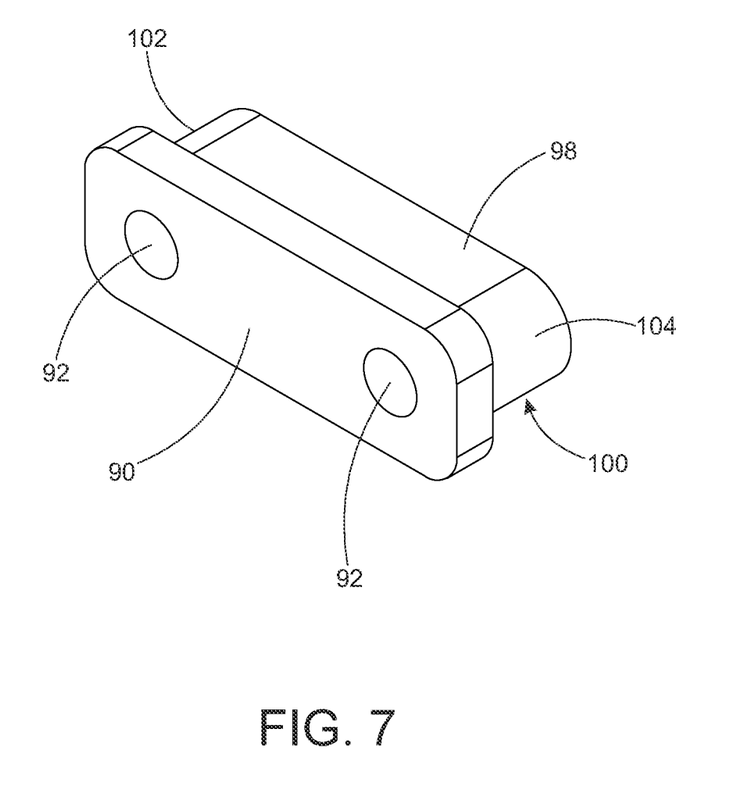
FIG. 7 is a perspective view of a center link pad of a center load rack and pinion steering mechanism, according to an embodiment.

As shown in FIG. 7, the center link pad 90 may have opposed left and right arcuate ends 102 and 104. Center link pad 90 is of sufficient length to encompass the spaced apertures 92, through which the center link mounting bolts 60 extend, and is shorter than the length of the bushing 88. In some embodiments, travel of the center link pad 90 is limited, and thus travel of the rack 32 within the passage 30 of the housing 12 is also limited, by contact of the left end 102 of the center link pad 90 with the left end 82 of the bushing 88 in a first direction, and by contact of the right end 104 of the center link pad 90 with the right end 84 of the bushing 88 in an opposed second direction.

Figure 6:
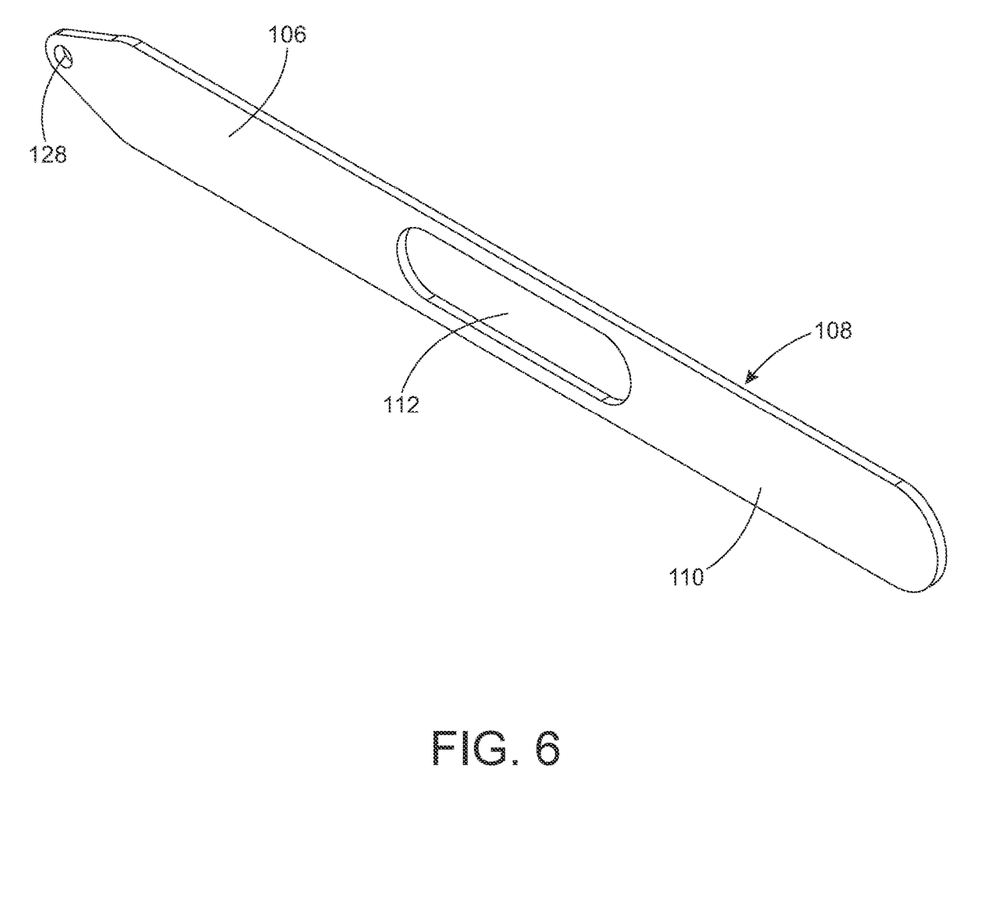
FIG. 6 is a perspective view of a cover plate of a center load rack and pinion steering mechanism, according to an embodiment.

Because the center link pad 90 is shorter than the bushing 88, the interior portions of the housing 12 would be left exposed to dust, dirt, moisture, and other external debris, but for a cover plate 106 that covers the slot 56. As shown in FIG. 6, the cover plate 106 is elongate, with opposed inner and outer surfaces 108 and 110, having an aperture 112 through which the center link pad 90 extends, the inner surface 108 thereof engaging the front surface 22 of the housing 12. The center link pad 90 engages the cover plate 106 such that the cover plate 106 moves longitudinally in concert with the center link pad 90 in response to longitudinal motion of the rack 32 within the passage 30. The cover plate 106 is of sufficient length to cover the slot 56 when the center link pad 90 is in any position within its range of travel.

Although the left and right ends 82 and 84 of the bushing 88 and the left and right ends 102 and 104 of the center link pad 90 are shown as being arcuate, this is not intended to be limiting. The left and right ends 82 and 84 of the bushing 88 and the left and right ends 102 and 104 of the center link pad 90 may be of any shape that is consistent with the functions of the bushing 88 and the center link pad 90.

Figure 10:
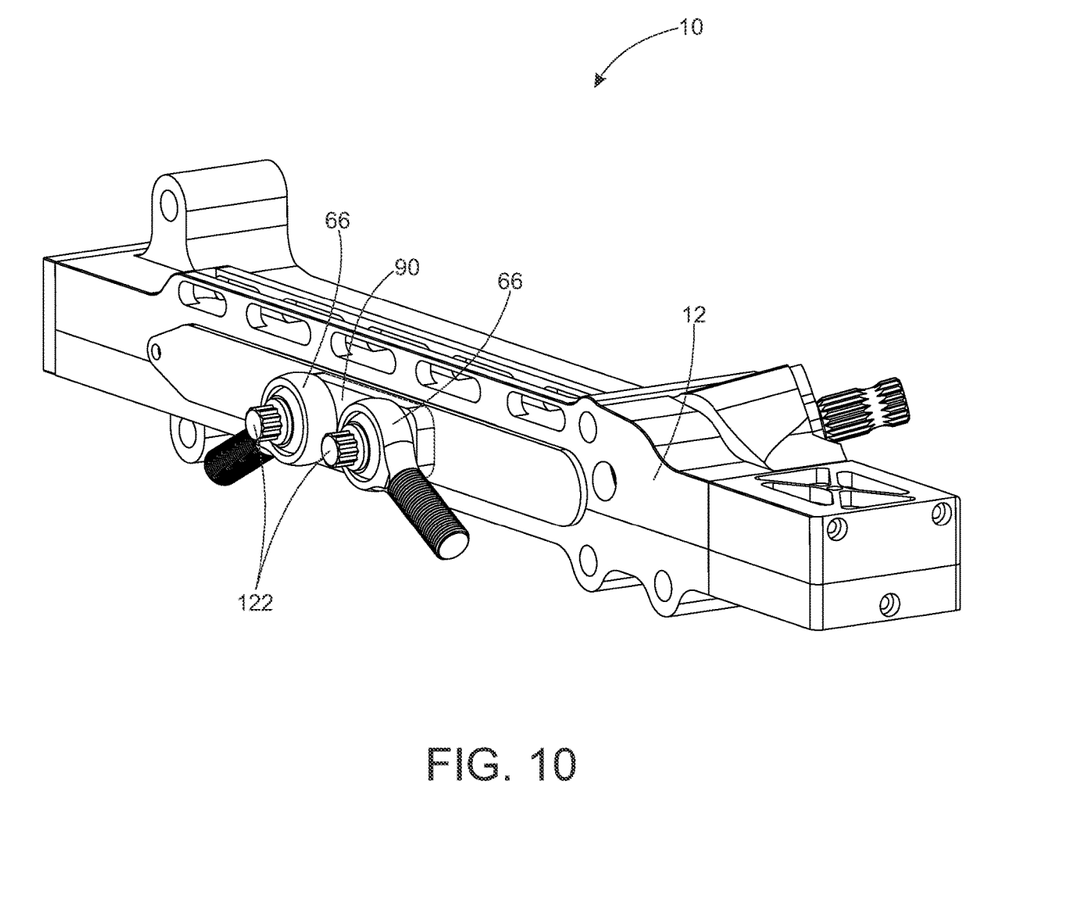
FIG. 10 is a perspective view of a center load rack and pinion steering mechanism, according to an alternative embodiment.

Some embodiments do not comprise a center link 58, nor a pair of center link mounting bolts 60. In such embodiments, as shown in FIG. 10, a pair of tie rod mounting bolts 122 engage the rack 32 directly, the tie rod mounting bolts 122 extending through the center link pad 90 and being threaded into the threaded recesses 64 of the rack 32, each of the pair of tie rods (not shown) being coupled to one of the tie rod mounting bolts 122 by a heim joint 66. The interfaces between the center link pad 90 and the bushing 88 similarly act to prevent twisting and varied upward and downward movements of the tie rod mounting bolts 122 and the rack 32 relative to the housing 12, thus minimizing damage to components of the steering mechanism 10.

In some embodiments, the cover plate 106 comprises an aperture 128 therethrough and the front surface 22 of the housing 12 further comprises a corresponding threaded recess 126 therein for receiving a bolt (not shown) for preventing movement of the cover plate 106 relative to the housing 12 while the center load rack and pinion steering mechanism 10 is not in use, such as during shipping.

The components defining any center load steering rack support apparatus may be formed of any of many different types of materials or combinations thereof that can readily be formed into shaped objects provided that the components selected are consistent with the intended operation of a center load steering rack support apparatus. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any center load steering rack support apparatus may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, sewing, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A center load rack and pinion steering mechanism comprising:
    a housing configured to couple to a frame of a vehicle;
    a rack housed within an inner passage of the housing;
    a pinion gear that engages a geared section of the rack, wherein the pinion gear is coupled to a steering column of the vehicle, wherein the rack travels within the inner passage in response to rotation of the pinion gear;
    a longitudinal slot coupled to the housing;
    a center link pad slidable within the slot; and
    a center link configured to mount to tie rods, wherein at least one center link is coupled to the center link pad, wherein the center link and the center link pad travel longitudinally in concert with the rack in response to rotation of the pinion gear, wherein an upper surface of the center link pad engages an upper inner surface of the slot and a lower surface of the center link pad engages a lower inner surface of the slot to prevent upward and downward movement and twisting of the center link pad and the center link relative to the rack.

2. The center load rack and pinion steering mechanism of claim 1, further comprising a bushing coupled to the longitudinal slot, wherein the upper surface of the center link pad engages the upper inner surface of the slot through the bushing and a lower surface of the center link pad engages the lower inner surface of the slot through the bushing.

3. The center load rack and pinion steering mechanism of claim 1, further comprising a cover plate wherein an inner surface thereof engages the front surface of the housing such that the cover plate covers the slot while the rack is in any position within its range of travel.

4. The center load rack and pinion steering mechanism of claim 2, wherein the center link pad further comprises a lip around the circumference of a front surface thereof that engages the cover plate to fix the position of the center link pad relative to the cover plate.

5. A method of preventing upward and downward movement and twisting of a center link of a center load steering mechanism coupled to a vehicle, the method comprising:
    coupling the center link to a center link pad, wherein the center link pad engages a longitudinal slot coupled to a housing of the center load steering mechanism;
    coupling first ends of the tie rods to the center link and second ends to wheels of the vehicle;
    moving the center link and the center link pad longitudinally along the longitudinal slot in response to rotation a steering wheel of the vehicle;
    preventing upward and downward movement and twisting of the center link pad and the center link relative to the rack in response to an upper surface of the center link pad engaging an upper inner surface of the slot and a lower surface of the center link pad engaging a lower inner surface of the slot when rotating the steering wheel of the vehicle.

6. The method of claim 5, further comprising coupling a bushing to the longitudinal slot, wherein the upper surface of the center link pad engages the upper inner surface of the slot through the bushing and a lower surface of the center link pad engages the lower inner surface of the slot through the bushing.

* * * * *